No. 750,708. PATENTED JAN. 26, 1904.
J. SCHILLER.
INSECT EXTERMINATOR.
APPLICATION FILED DEC. 30, 1902.
NO MODEL.

Witnesses
E. H. Reichenbach
L. O. Hilton

Inventor
J. Schiller
By H. B. Willson & Co.
Attorneys

No. 750,708. Patented January 26, 1904.

UNITED STATES PATENT OFFICE.

JOSEPH SCHILLER, OF BURLINGTON, TEXAS.

INSECT-EXTERMINATOR.

SPECIFICATION forming part of Letters Patent No. 750,708, dated January 26, 1904.

Application filed December 30, 1902. Serial No. 137,126. (No model.)

*To all whom it may concern:*

Be it known that I, JOSEPH SCHILLER, a citizen of the United States, residing at Burlington, in the county of Milam and State of Texas, have invented certain new and useful Improvements in Insect-Exterminators; and I do declare the following to be a full, clear, and exact description of the invention, such as will enable others skilled in the art to which it appertains to make and use the same.

My invention is an improved insect-destroying machine especially adapted for destroying the cotton-boll weevil; and it consists in the peculiar construction and combination of devices hereinafter fully described and claimed.

The object of my invention is to provide a compact machine of this class which is efficient in dislodging the insects from cotton and other plants and in destroying the insects as the machine advances along the rows.

Figure 1:
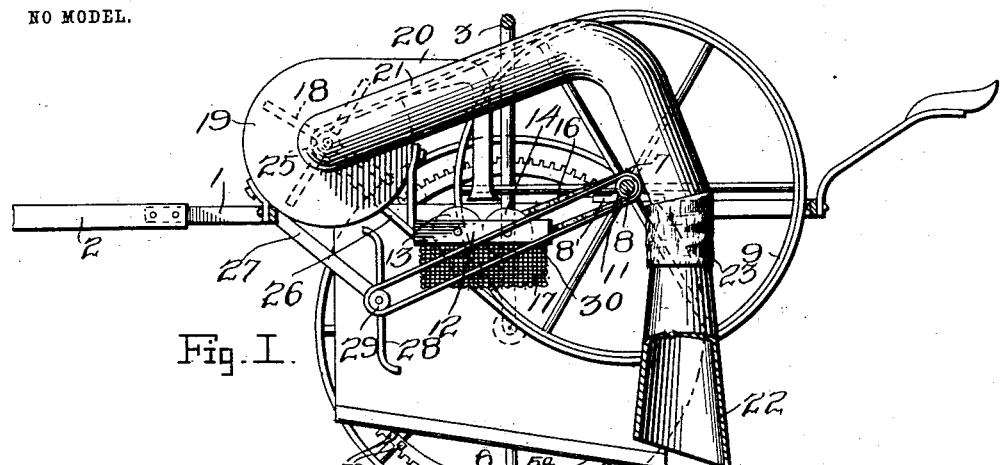
Figure 2:
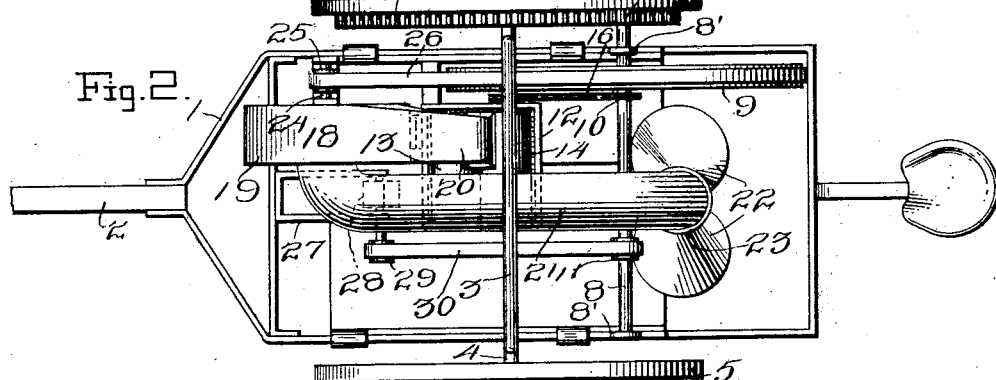
Figure 3:
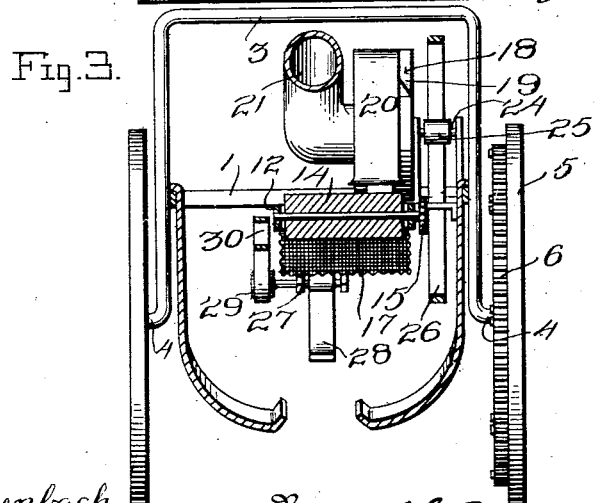

In the accompanying drawings, Figure 1 is a vertical longitudinal sectional view of an insect-exterminator embodying my improvements. Fig. 2 is a top plan view of the same, and Fig. 3 is a transverse sectional view.

In the embodiment of my invention here shown I provide a frame 1, which is rectangular in form and to the front end of which is attached a draft pole or tongue 2. An arched axle 3 has its vertical portions attached to the side bars of the frame at points intermediate their ends, said axle depending from the frame and being provided with spindles 4, on which are the supporting and traction wheels 5. One of the latter has a spur-gear 6 on its inner side. This spur-gear is preferably a peripherally-spurred ring secured to the inner side of the wheel 5 by means of clip-bolts 5ª, which engage the spokes of the wheel.

The spur-gear 6 engages a pinion 7 on a shaft 8, that is disposed transversely in the frame at a suitable distance from the rear end thereof and is journaled in suitable bearings 8' on the sides of the frame. On this shaft are a pulley 9, a pulley 10, and a pulley 11 of unequal size or diameter, the pulley 9 being the largest.

Near the center of the frame 1 and somewhat in advance of the shaft 8 is a frame 12, in which is mounted a pair of crushing-rollers 13 14, the latter being provided at one end with a pulley 15, which is connected by an endless belt 16 to the pulley 10 on the shaft 8. Below the crushing-rollers is a basket or other suitable receptacle 17 for the reception of the insects crushed by and dropped from the rollers. An exhaust-fan 18 is mounted in a casing 19, which is supported at the front side of the frame 1, near one side thereof, and from which extends a discharge-spout 20, the discharge end of which is directly above the crushing-rollers. An air-intake spout 21 leads to the said casing and extends rearwardly therefrom, and from the rear end of the said intake-spout depend a pair of intake-funnels 22, which are flexibly connected to the intake-spout, as at 23, and which are adapted to pass through and among the plants as the machine is drawn along the rows. The exhaust-fan has its shaft 24 provided with a pulley 25, which pulley is connected by an endless belt 26 to the pulley 9 of the shaft 8.

From the front side of the frame 1, at the center thereof, extends a longitudinally-disposed supporting arm or bracket 27, in which is journaled a revoluble beater or flail 28. The latter has a pulley 29, which is connected by a belt 30 to the pulley 11 on the shaft 8.

As the machine is drawn along with its wheels 5 astride of a row of cotton-plants motion is communicated to the beater or flail, the exhaust-fan, and the crushing-rollers by the means hereinbefore described, as will be understood. The beater or flail serves to shake the plants and to cause the weevils to fly therefrom and such immature insects as may be thereon to be dislodged therefrom. The insects are caught by the suction of the exhaust-fan, drawn up through the suction-funnels and suction-pipe into the fan-casing, and discharged from the latter through the spout 20 onto the crushing-rollers, which as they revolve cause the insects to be passed between them and to be crushed. The crushed insects drop from the rollers into the vessel or basket placed to receive them, as hereinbefore described.

On the sides of the frame 1 are secured depending downwardly-converging fenders 31, which serve to inclose the plants on opposite sides as they are subjected to the action of the exterminating-machine and to catch such insects as may fly or drop from the plants and conduct them within the influence of the suction of the exhaust-fan. At the lower sides of the fenders are upturned flanges 32, which prevent the insects from dropping from the fenders at points between their front and rear ends. It will be observed by reference to Figs. 1 and 3 of the drawings that the lower sides of the fenders are inclined downwardly rearwardly, so that the insects which are caught by the fenders and dropped to the lower side thereof against the flanges 32 are caused by the motion of the machine, which necessarily shakes the fenders, and by the downward rearward inclination of the lower sides of the fenders and the troughs formed therein by the flanges 32 to be dropped from the rear ends of the fenders at a point in close proximity to the suction-funnels, so that the suction of the exhaust upon them catches the said insects as they are thus dropped, and they are hence drawn into the fan and are discharged upon the crushing mechanism, as hereinbefore stated. It will be observed that the beater is disposed in advance of the suction-funnels, so that it is caused to beat the plants in front of the funnels, the latter operating, as hereinbefore described, to convey the insects as they are dislodged from the plants to the destroying mechanism by the exhaust-fan.

From the foregoing description, taken in connection with the accompanying drawings, the construction, mode of operation, and advantages of my invention will be readily apparent, it is thought, without requiring a more extended explanation.

Various changes in the form, proportion, and the minor details of construction may be resorted to without departing from the principle or sacrificing any of the advantages of this invention.

Having thus fully described my invention, what I claim as new, and desire to protect by Letters Patent, is—

In a machine of the class described, the combination of longitudinally-disposed fenders abreast of each other, spaced apart and provided with means for arresting the descent of insects thereon and for discharging the insects at the rear ends thereof, a beater between the fenders, and an exhaust element having a funnel disposed between the fenders at the point where the insects are discharged therefrom, substantially as described.

In testimony whereof I have hereunto set my hand in presence of two subscribing witnesses.

JOSEPH SCHILLER.

Witnesses:
W. H. O'SULLIVAN,
MICHAEL MORRIS.